(12) United States Patent
Cable

(10) Patent No.: US 8,294,749 B2
(45) Date of Patent: Oct. 23, 2012

(54) METHODS AND APPARATUS FOR DISPLAYING IMAGES USING HOLOGRAMS

(75) Inventor: Adrian Cable, Harlton (GB)

(73) Assignee: Light Blue Optics Ltd., Cambridge, Cambridgeshire (GB)

( * ) Notice: Subject to any disclaimer, the term of this patent is extended or adjusted under 35 U.S.C. 154(b) by 959 days.

(21) Appl. No.: 12/066,825

(22) PCT Filed: Sep. 15, 2006

(86) PCT No.: PCT/GB2006/050291
§ 371 (c)(1),
(2), (4) Date: Jan. 9, 2009

(87) PCT Pub. No.: WO2007/031797
PCT Pub. Date: Mar. 22, 2007

(65) Prior Publication Data
US 2009/0219380 A1 Sep. 3, 2009

(30) Foreign Application Priority Data
Sep. 16, 2005 (GB) .................................. 0518912.1

(51) Int. Cl.
*H04N 9/64* (2006.01)
(52) U.S. Cl. ........................................... 348/40; 359/29
(58) Field of Classification Search .............. 348/40–41; 359/11, 23–26, 29–30, 35
See application file for complete search history.

(56) References Cited

U.S. PATENT DOCUMENTS
| | | | |
|---|---|---|---|
| 6,829,384 B2 * | 12/2004 | Schneiderman et al. | 382/154 |
| 2007/0024999 A1 * | 2/2007 | Crossland et al. | 359/859 |
| 2009/0002787 A1 | 1/2009 | Cable et al. | |
| 2009/0128619 A1 | 5/2009 | Mash | |

FOREIGN PATENT DOCUMENTS
WO WO 2005/059881 A2 6/2005
WO WO 2006/134404 A1 12/2006

OTHER PUBLICATIONS

Mar. 18, 2008 International Search Report for PCT/GB2006/050291.
Shiyuan Yang et al: "*Interlacing Technique Approach for the Synthesis of Kinoforms*" Applied Optics Opt. Soc. America USA, vol. 35, No. 35, Dec. 10, 1996, pp. 6983-6989, XP002421574.
Chang, et al. "The Modified Input-output Algorithm for the Synthesis of Computer-generated Holograms," *Optik*, vol. 95, No. 4, pp. 155-160, Feb. 1994.
Dufresne, et al. "Computer-generated Holographic Optical Tweezer Arrays," *Review of Scientific Instruments*, vol. 72, No. 3, pp. 1810-1816, Mar. 2001.

* cited by examiner

*Primary Examiner* — Brendan Higa
(74) *Attorney, Agent, or Firm* — Knobbe, Martens, Olson & Bear, LLP

(57) ABSTRACT

The invention relates to method, computer program code and signal processing/image display systems for displaying one or more images using holographic techniques. We describe a method of generating data for displaying an image defined by displayed image data using a plurality of holographically generated temporal subframes, the temporal subframes being displayed sequentially in time such that they are perceived as a single noise-reduced image. The method includes generating from the displayed image data holographic data for each subframe of said set of subframes such that successive replay of holograms defined by said holographic data for said subframes gives the appearance of said image, and wherein the method further includes, when generating said holographic data for a said subframe, compensating for noise in said displayed image arising from one or more previous subframes of said sequence of holographically generated subframes.

13 Claims, 8 Drawing Sheets

METHODS AND APPARATUS FOR DISPLAYING IMAGES USING HOLOGRAMS

CROSS-REFERENCE TO RELATED APPLICATIONS

This application is the U.S. National Phase under 35 U.S.C. §371 of International Application No. PCT/GB2006/050291, filed Sep. 15, 2006, designating the United States and published in English on Mar. 22, 2007, as WO 2007/031797, which claims priority to United Kingdom Application No. 0518912.1, filed Sep. 16, 2005.

FIELD OF THE INVENTION

This invention relates to method, computer program code and signal processing/image display systems for displaying one or more images using holographic techniques.

DESCRIPTION OF RELATED ART

Conventional approaches for binary hologram generation have been employed for some time in application such as optical switching, correlators for object identification, and optical tweezers. In such approaches, a single target input image is transformed using a particular algorithm to form a single hologram, which is then presented as a binary phase pattern on a microdisplay, for example to display the tart image when light is projected through the microdisplay.

While there are a number of theoretical advantages to using binary phase holography for image projection, such as efficiency and miniaturisability, such a "single frame, single hologram" approach is not suitable for projecting video or high quality images as the holograms produced exhibit a high degree of noise which makes them perceptually unsatisfactory. This noise results from fundamental physical constraints associated with diffractive imaging.

SUMMARY OF THE INVENTION

We therefore employ an alternative approach, our preferred implementation of which is termed OSPR (One-Step Phase Retrieval). Instead of generating a single hologram for each video or image frame (at 30 Hz, for example), one can generate a number N of "subframe holograms" for each video (or image) frame, which are displayed sequentially within the time period of a single frame (in this example, 1/30 of a second). It can be shown that, if each of these subframe holograms forms the same image but with different (and independent) noise, the limited temporal bandwidth of the eye results in an averaging effect (integration with the eye), causing a substantial decrease in the perceived level of noise. More precisely, noise variance, which correlates strongly with the perceptual level of noise present, can be shown to fall as 1/N. This is illustrated conceptually in FIG. 1, in which the eye integrates the replay field formed by the N holograms over the 1/30 second time window, resulting in a low noise image.

Broadly speaking, the technique we employ is to deliberately introduce noise into the subframe holograms by introducing a random phase component prior to generating a hologram so that each individual subframe is relatively noisy, counter-intuitively the averaging process over multiple subframes resulting in an overall perceived noise reduction. This approach further permits the hologram to be quantised, for example into two levels (binarised) or preferably four levels, prior to display to form an image subframe.

In this specification we will refer in detail to our preferred OSPR procedure but the techniques we describe are also applicable to other systems in which a plurality of holographic subframes combine so that they are perceived as a single, reduced-noise image. Likewise, although reference is made, at times, to video the skilled person will understand that the techniques we describe are not restricted to video but may also be applied to the display of single image frames.

Thus we have previously described, in WO2005/059881, a method of displaying a holographically generated video image comprising plural video frames, the method comprising providing for each frame period a respective sequential plurality of holograms and displaying the holograms of the plural video frames for viewing the replay field thereof, whereby the noise variance of each frame is perceived as attenuated by averaging across the plurality of holograms.

Broadly speaking embodiments of the method aim to display an image by projecting light via a spatial light modulator (SLM) onto a screen. The SLM is modulated with holographic data approximating a hologram of the image to be displayed but this holographic data is chosen in a special way, the displayed image being made up of a plurality of temporal subframes, each generated by modulating the SLM with a respective subframe hologram. These subframes are displayed successively and sufficiently fast that in the eye of a (human) observer the subframes (each of which have the spatial extent of the displayed image) are integrated together to create the desired image for display.

Each of the subframe holograms may itself be relatively noisy, for example as a result of quantising the holographic data into two (binary) or more phases, but temporal averaging amongst the subframes reduces the perceived level of noise. Embodiments of such a system can provide visually high quality displays even though each subframe, were it to be viewed separately, would appear relatively noisy.

A scheme such as this has the advantage of reduced computational requirements compared with schemes which attempt to accurately reproduce a displayed image using a single hologram, and also facilitate the use of a relatively inexpensive SLM.

Here it will be understood that the SLM will, in general, provide phase rather than amplitude modulation, for example a binary device providing relative phase shifts of zero and $\pi$ (+1 and −1 for a normalised amplitude of unity). In preferred embodiments, however, more than two phase levels are employed, for example four phase modulation (zero, $\pi/2$, $\pi$, $3\pi/2$), since with only binary modulation the hologram results in a pair of images one spatially inverted in respect to the other, losing half the available light, whereas with multi-level phase modulation where the number of phase levels is greater than two this second image can be removed. Further details can be found in our earlier application WO2005/059881, hereby incorporated by reference in its entirety.

We have also described, in GB0511962.3, filed 14 Jun. 2005, a hardware accelerator for such a system, and have further described a preferred optical projection arrangement in GB10512179.3, filed 15 Jun. 2005, both also hereby incorporated by reference.

However the above described techniques based upon creating a combined image through the display of multiple subframe holograms still suffer from difficulties in their practical implementation. Broadly speaking, the problem we address here is that the number of subframes required for perception of a high quality image is relatively large and potentially impractical for some applications, for example video where typically 24 to 30 or more image frames are to be displayed each second. (Here "video" includes, for example, computer screens which are refreshed at similar or higher rates). Thus the inventors have constructed a demonstrator (using a microdisplay from CRL Opto Limited, Scotland) which has a frame rate sufficient to display N=24 subframe holograms per video frame. While N=24 with the conventional OSPR approach does produce images of moderate quality, the level of noise present is still too large for high-quality reproduction of video images. With convention OSPR, one way to decrease the noise level further is to generate a larger number of subframe holograms per video frame, i.e. to increase N, with preliminary tests showing that around N=500 is required for "perceptually perfect" video. However, microdisplay technology that can display frames this fast is not currently available, and an image processor to calculate such a large number of holograms every video frame would consume an undesirably large amount of power.

There is therefore a need for improvement to the above described techniques.

According to a first aspect of the present invention there is therefore provided a method of generating data for displaying an image defined by displayed image data using a plurality of holographically generated temporal subframes, said temporal subframes being displayed sequentially in time such that they are perceived as a single noise-reduced image, the method comprising generating from said displayed image data holographic data for each subframe of said set of subframes such that successive replay of holograms defined by said holographic data for said subframes gives the appearance of said image, and wherein the method further comprises, when generating said holographic data for a said subframe, compensating for noise in said displayed image arising from one or more previous subframes of said sequence of holographically generated subframes.

Broadly speaking the inventors have recognised that the number of subframes required for a given image quality can be reduced by adapting the noise generated for each subframe so that the noise in different subframes is not independent. More particularly in embodiments the method employs feedback so that the noise of each subframe compensates for or substantially cancels the cumulative noise from previously displayed subframes, albeit adding a further noise contribution of its own. In this ways in embodiments, the perceived noise decreases as $1/N_2$ rather than $1/N$, providing a substantial advantage in computability.

It will be appreciated that the noise compensation need not be complete for advantage to be derived from embodiments of the method. Furthermore, although the (spatial) resolution of the displayed image and the spatial resolution of a holographically displayed subframe may correspond this is not necessary and it can be advantageous to use a holographically displayed subframe of a higher resolution than that of the target image to be displayed.

In preferred embodiments each successive subframe after the first substantially compensates for noise introduced by all the previously displayed holographic subframes contributing to the displayed image, although in other embodiments, for example, the compensation may be applied in the last holographic subframe displayed (of those contributing to the displayed image) rather than at each successive stage.

Preferably, however, the compensating comprises determining a noise compensation frame for a subframe and then adjusting the target image for the next holographic subframe to be determined using this noise-compensation frame. It will be appreciated that this noise-compensation frame is not displayed per se. The noise compensation frame may comprise, for example, a matrix or array corresponding in size to the displayed image. In embodiments the noise-compensation frame comprises a cumulative total of the noise introduced by previously holographically displayed subframes, in effect a running total of the noise which would be seen by the eye. (The temporal response of the eye begins to fall with frequency at around 40 Hz and in general embodiments of the method are implemented well within this time frame such that substantially all the holographic subframes combine or are integrated by an observer's eye.)

The determining of a noise-compensation frame for a subframe preferably comprises accumulating noise-compensation frames from one or more previous subframes—that is in preferred embodiments at each step a cumulative total of the noise is formed by, in effect, adding the noise introduced by the immediate previous subframe. With this approach the noise-compensation applied for a subframe is responsive to the noise introduced by any (all) previously displayed subframes contributing to the combined displayed image. The accumulating of noise-compensation frames for each successive subframe, in embodiments, comprises accumulating displayed subframe data for a previously displayed subframe, the displayed subframe data comprising spatial image data for the subframe derived from the holographic subframe data, that is in effect keeping a running total of the noise from previously displayed subframes, the noise being the noise in the spatially displayed image resulting from the holographic subframe data.

Thus, broadly speaking, when generating holographic data for a subframe embodiments of the method determine displayed image subframe data for a previous subframe and then determine target displayed image data for generating the holographic data for a current subframe by adjusting the displayed image data using the displayed subframe data for a previous subframe.

The adjusting of the displayed image data prior to generating holographic data for the next subframe preferably comprises transforming the previous subframe data from a frequency domain to a spatial domain, for example using a (fast) Fourier transform or inverse Fourier transform, and subtracting the transformed data from data derived from the displayed image data. In practice a frequency-space transform of this sort will generally introduce a scaling factor and therefore the inverse of this scaling factor is preferably applied before subtracting the transformed data from the data derived from the displayed image data. The data derived from the displayed image data may comprise, for example, a modified version of the displayed image data, adjusted to compensate for a response of the display such as a colour response, as described further below.

In some preferred embodiments the generation of holographic data for a subframe comprises substantially randomising a phase component of data derived from the displayed image data (from which the holographic subframe data is to be generated), transforming the randomised data from a spatial domain into a frequency domain, and quantising this transformed data. This effectively implements the preferred, "OSPR" method of generating holographic data for a said subframe, as previously described.

The displayed image may comprise either a monochrome or a colour image, for example combining three colour channels (red, green and blue) either spatially (three lasers and projection systems) or temporally (a common time-multiplexed projection system). By convention colour standards are generally referenced to colours defined within a cathode ray tube (CRT)-based colour display. Thus for consistency with conventional colour space representations such as RGB (red, green, blue) or other luminence-chrominence based representations such as YCC, YUV, YIQ and the like the displayed image data may be adjusted prior to generating the holographic subframe data to perform a colour space conversion. This may comprise, for example, raising a matrix of the displayed image data to a fractional power. It will be appreciated that adjustment and/or compensation of the displayed image data may also be made prior to generation of the holographic subframes for other reasons and that it may be desirable to adjust the response of the displayed image to the displayed image data, for example, in monochrome displays.

In a related aspect the invention provides a method of generating data for displaying an image defined by displayed image data using a plurality of holographically generated temporal subframes, said temporal subframes being displayed in temporal combination such that they are perceived in combination, the method comprising generating from said displayed image data holographic data for each subframe of said set of subframes such that replay of holograms defined by said holographic data for said subframes gives the appearance of said image, and wherein said generating of holographic data for a subframe includes generating noise, the noise generated for at least one of said subframes being dependent upon the noise in one or more others of said subframes.

Preferably in embodiments of this method the noise generating comprises generating noise for at least one of the subframes to compensate for noise in one or more others of the subframes in the perceived combination. Preferably the generating of noise comprises generating noise comprises generating noise for each successive subframe after a first to compensate for accumulated noise in the perceived combination from the preceding subframes of the temporal combination. In embodiments the noise-generating comprises adding a substantially random phase component to spatial data used for generating the holographic data, and afterwards quantising the holographic data.

The invention further provides processor control code to implement the above-described methods, in particular on a data carrier such as a disk, CD- or DVD-ROM, programmed memory such as read-only memory (Firmware), or on a data carrier such as an optical or electrical signal carrier. Code (and/or data) to implement embodiments of the invention may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog (Trade Mark) or VHDL (Very high speed integrated circuit Hardware Description Language). As the skilled person will appreciate such code and/or data may be distributed between a plurality of coupled components in communication with one another.

In another aspect the invention provides a system for displaying an image defined by displayed image data using a plurality of holographically generated temporal subframes, said temporal subframes being displayed sequentially in time such that they are perceived as a single noise-reduced image, the system comprising: an input for said displayed image data; data memory for storing said displayed image data and said holographic subframe data; a holographic image data output; program memory storing processor control code; and a processor coupled to said program memory, data memory, input, and output, to load and implement said processor control code, said code comprising code for controlling the processor to: generate from said displayed image data holographic data for each subframe of said set of subframes such that successive replay of holograms defined by said holographic data for said subframes gives the appearance of said image; and, when generating said holographic data for a said subframe, compensate for noise in said displayed image arising from one or more previous subframes of said sequence of holographically generated subframes.

In a further related aspect the invention provides a system for displaying an image defined by displayed image data using a plurality of holographically generated temporal subframes, said temporal subframes being displayed in temporal combination such that they are perceived in combination, as a single noise-reduced image, the system comprising: an input for said displayed image data; data memory for storing said displayed image data and said holographic subframe data; a holographic image data output; program memory storing processor control code; and a processor coupled to said program memory, data memory, input, and output, to load and implement said processor control code, said code comprising code for controlling the processor to: generate from said displayed image data holographic data for each subframe of said set of subframes such that successive replay of holograms defined by said holographic data for said subframes gives the appearance of said image; and generate noise data for a said subframe, the noise generated for at least one of said subframes being dependent upon the noise in one or more others of said subframes.

Embodiments of the above described methods, computer program code and systems are particularly useful for displaying a sequence of images, more particularly video.

For efficient implementation of the above described methods hardware adapted to implement embodiments of the methods would be beneficial.

Thus according to a further aspect of the invention there is provided a hardware image display system for displaying an image defined by displayed image data using a plurality of holographically generated temporal subframes, said temporal subframes being displayed sequentially in time such that they are perceived as a single noise-reduced image, by generating from said displayed image data holographic data for each subframe of said set of subframes such that successive replay of holograms defined by said holographic data for said subframes gives the appearance of said image, the system comprising: an input for said displayed image data; a space-frequency transform system having an input coupled to said displayed image data input and having an output, for performing a 2D space-frequency transform of data derived from said displayed image data; a holographic image data output coupled to said space-frequency transform system output; and a frequency-space transform system having an input coupled to said holographic image data output, and having an output, for performing a 2D frequency-space transform of data derived from said holographic subframe data; and a noise reduction system coupled between said displayed image data input and said space-frequency transform system input and to said frequency-space transform system output for adjusting said displayed image data using holographic subframe data for a subframe prior to generation of subframe data for a subsequent subframe.

Advantageously the two-dimensional space-frequency transform and/or frequency-space transform systems may be implemented by two one-dimensional transform systems. Preferred embodiments of the hardware further comprise a pseudo-random signal generator for adding a pseudo-random phase component to the data input to the space-frequency transform system. Preferably a quantiser is coupled between the output of the space-frequency transform system and the holographic image data output.

BRIEF DESCRIPTION OF THE DRAWINGS

These and other aspects of the invention will now be further described, by way of example only, with reference to the accompanying figures in which.

DETAILED DESCRIPTION OF PREFERRED EMBODIMENTS

Basic (Non-Adaptive) OSPR

It is helpful, as a preliminary, to describe our basic (non-adaptive) OSPR algorithm and its implementation. The algorithm is a method of generating, for each still or video frame $I=I_{xy}$, sets of N binary-phase holograms $h^{(1)} \ldots h^{(N)}$. Statistical analysis of the algorithm has shown that such sets of holograms form replay fields that exhibit mutually independent additive noise.

1. Let $G_{xy}^{(n)} = I_{xy} \exp(j\phi_{xy}^{(n)})$ where $\phi_{xy}^{(n)}$ is uniformly distributed between 0 and $2\pi$ for $1 \leq n \leq N/2$ add $1 \leq x, y \leq m$
2. Let $g_{uv}^{(n)} = F^{-1}[G_{xy}^{(n)}]$ where $F^{-1}$ represents the two-dimensional inverse Fourier transform operator, for $1 \leq n \leq N/2$
3. Let $m_{uv}^{(n)} = \Re\{g_{uv}^{(n)}\}$ for $1 \leq n \leq N/2$
4. Let $m_{uv}^{(n+N/2)} = \Im\{g_{uv}^{(n)}\}$ for $1 \leq n \leq N/2$
5.

$$\text{Let } h_{uv}^{(n)} = \begin{cases} -1 & \text{if } m_{uv}^{(n)} < Q^{(n)} \\ 1 & \text{if } m_{uv}^{(n)} \geq Q^{(n)} \end{cases}$$

where $Q^{(n)} = \text{median}(m_{uv}^{(n)})$ and $1 \leq n \leq N$

Step 1 forms N targets $G_{xy}^{(n)}$ equal to the amplitude of the supplied intensity target $I_{xy}$, but with independent identically-distributed (i.i.t.), uniformly-random phase. Step 2 computes the N corresponding full complex Fourier transform holograms $g_{uv}^{(n)}$. Steps 3 and 4 compute the real part and imaginary part of the holograms, respectively. Binarisation of each of the real and imaginary parts of the holograms is then performed in step 5: thresholding around the median of $m_{uv}^{(n)}$ ensures equal numbers of −1 and 1 points are present in the holograms, achieving DC balance (by definition) and also minimal reconstruction error. In an embodiment, the median value of $m_{uv}^{(n)}$ is assumed to be zero. This assumption can be shown to be valid and the effects of making this assumption are minimal with regard to perceived image quality. Further details can be found in the applicant's earlier application (ibid), to which reference may be made.

Figure 1:
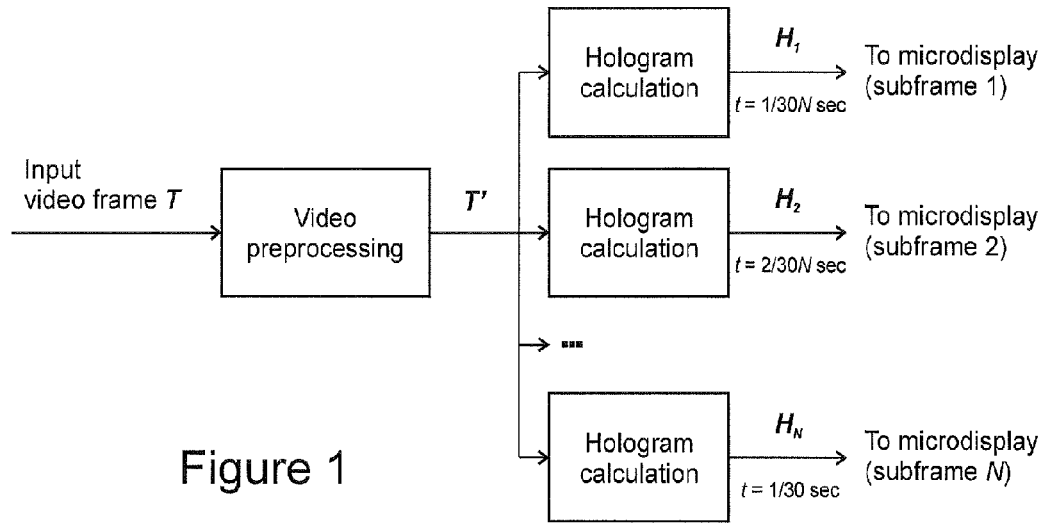
FIG. 1 shows a system for generating a plurality (N) of subframe holograms for displaying a singe image frame.
Figure 2:
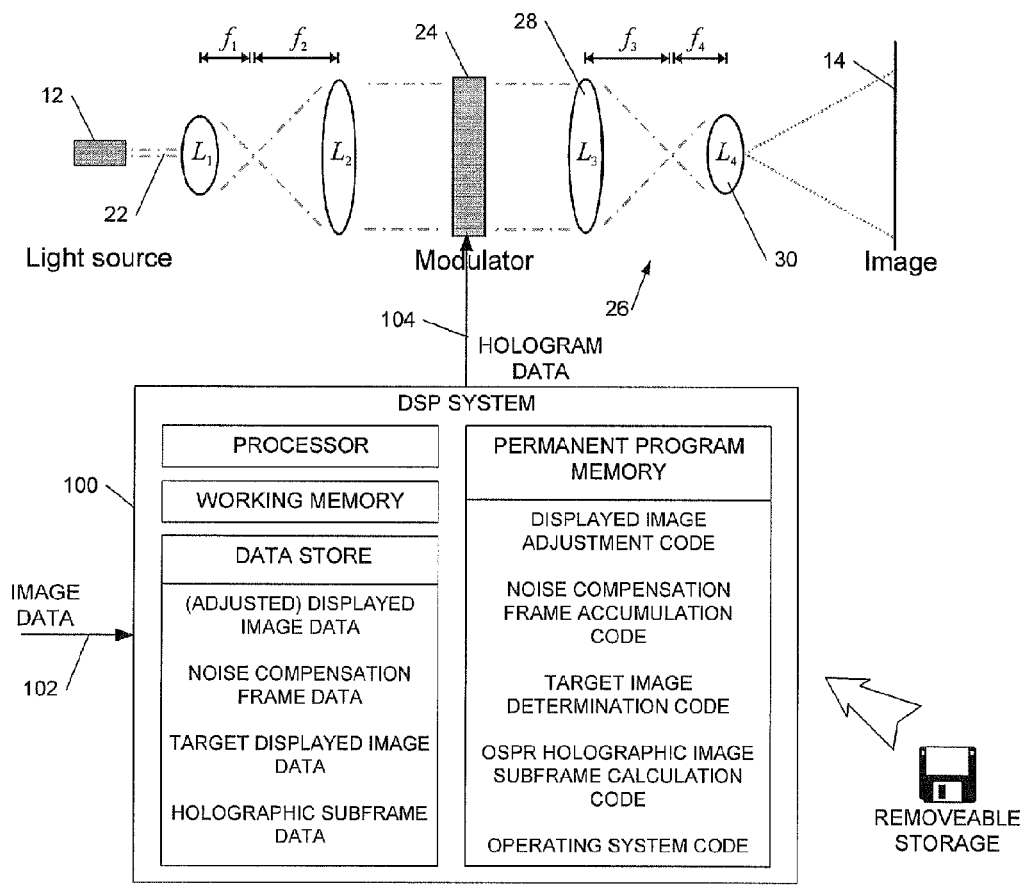
FIG. 2 shows an example of an optical system for a holographic projection module.

FIG. 2 shows an example optical system for a holographic projection module. Referring to FIG. 2, a laser diode 20 provides substantially collimated light 22 to a spatial light modulator 24 such as a pixellated liquid crystal modulator. The SLM 24 phase modulates lights 22 and the phase modulated light is provided a demagnifying optical system 26, hi the illustrated embodiment) optical system 26 comprises a pair of lenses 28, 30 with respective focal lengths $f_1, f_2, f_1 < f_2$, spaced apart at distance $f_1 + f_2$. Optical system 26 increases the size of the projected holographic image by diverging the light forming the displayed image, as shown.

Lenses $L_1$ and $L_2$ (with focal lengths $f_1$ and $f_2$ respectively) form the beam-expansion pair. This expands the beam from the light source so that it covers the whole surface of the modulator. Lens pair $L_3$ and $L_4$ (with focal lengths $f_3$ and $f_4$ respectively) form the beam-expansion pair. This effectively reduces the pixel size of the modulator, thus increasing the diffraction angle. As a result, the image size increases. The increase in image size is equal to the ratio of $f_3$ to $f_4$, which are the focal lengths of lenses $L_3$ and $L_4$ respectively.

A digital signal processor system 100 has an input 102 to receive image data from the consumer electronic device defining the image to be displayed. The DSP 100 implements a procedure as described herein to generate sub-frame (phase) hologram data for a plurality of holographic sub-frames which is provided from an output 104 of the DSP 100 to the SLM 24, optionally via a driver integrated circuit if needed. The DSP 100 drives SLM 24 to project a plurality of phase hologram sub-frames which combine to give the impression of displayed image 14.

The DSP system 100 comprises a processor coupled to working memory, to data memory storing (adjusted) displayed image data, noise compensation frame data, target displayed image data, and holographic subframe data and to program memory such as ROM, Flash RAM or other non-volatile memory storing processor control code, in particular displayed image adjustment code, noise compensation frame accumulation code, target image determination code, OSPR holographic image subframe calculation code, and operating system code to implement corresponding functions as described further later.

We next describe a hardware implementation of the basic OSPR procedure we have previously described (ibid), with reference to FIGS. 3 to 9, and then describe hardware for the implementation of the improvements referred to above.

Figure 3:
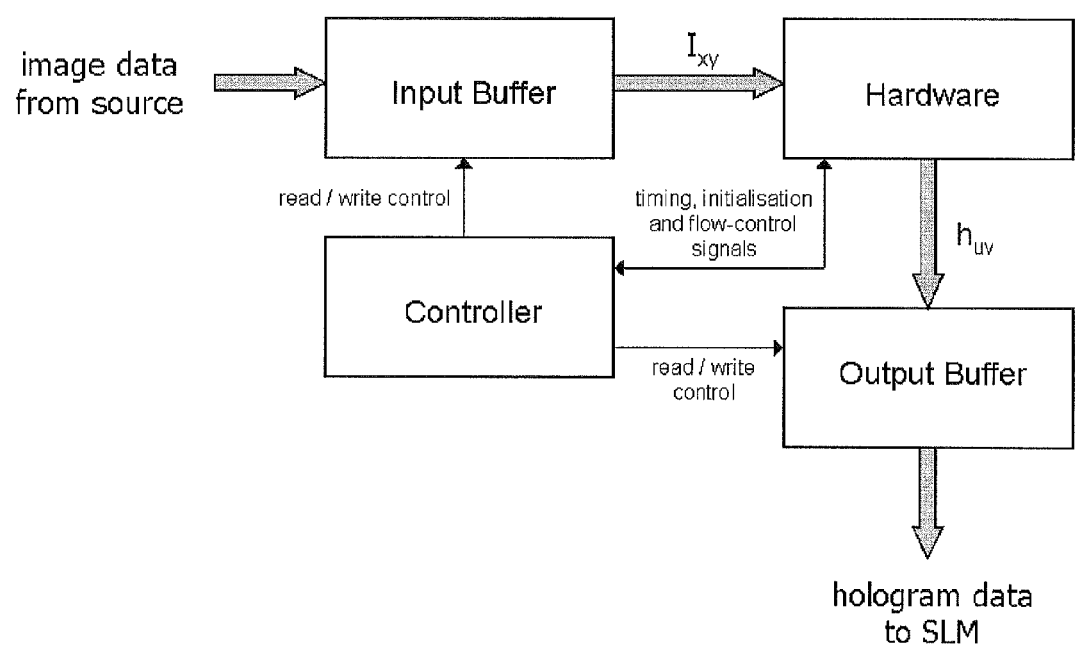
FIG. 3 shows a block diagram of an embodiment of a hardware for implementing an OSPR procedure.

Referring to FIG. 3, this shows an outline block diagram of hardware for a holographic OSPR-based image display system. The input to the system of FIG. 3 is preferably image data from a source such as a computer, although other sources are equally applicable. The input data is temporarily stored in one or more input buffer, with control signals for this process being supplied from one or more controller units within the system. Each input buffer preferably comprises dual-port memory such that data is written into the input buffer and read out from the input buffer simultaneously. The output from the input buffer shown in FIG. 3 is an image frame, labelled I, and this becomes the input to the hardware block. The hardware block, which is described in more detail below, performs a series of operations on each of the aforementioned image frames, I, and for each one produces one or more holographic sub-frames, h, which are sent to one or more output buffer. Each output buffer preferably comprises dual-port memory. Such sub-frames are outputted from the aforementioned output buffer and supplied to a display device, such as a SLM, optionally via a driver chip. The control signals by which this process is controlled are supplied from one or more controller unit. The control signals preferably ensure that one or more holographic sub-frames are produced and sent to the SLM per video frame period. In an embodiment, the control signals transmitted from the controller to both the input and output buffers are read/write select signals, whilst the signals between the controller and the hardware block comprise various timing, initialisation and flow-control information.

Figure 4:
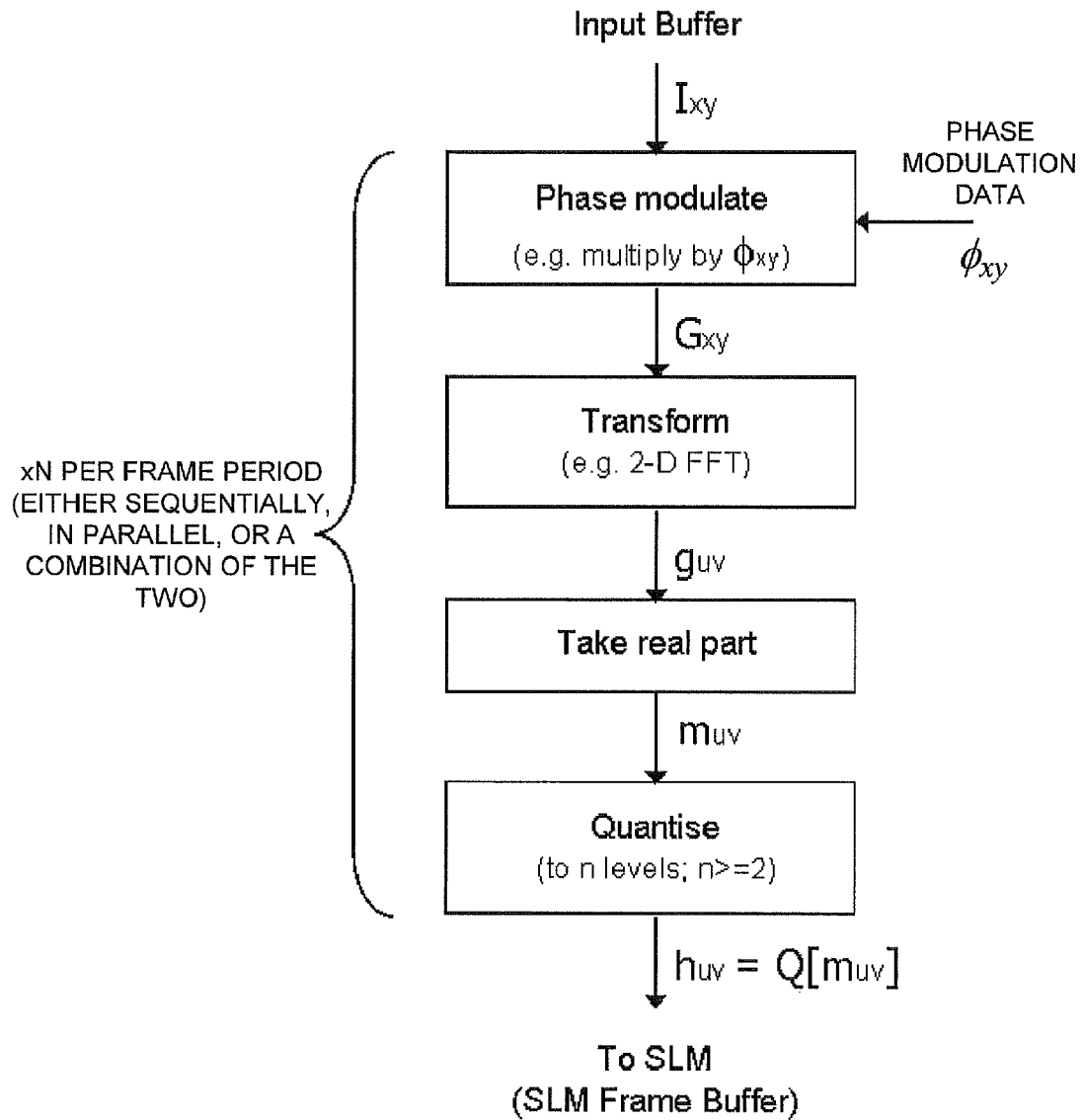
FIG. 4 shows the operations performed within an embodiment of a hardware block as shown in FIG. 3.

FIG. 4 shows a hardware block for the system of FIG. 3, comprising a set of hardware elements designed to generate one or more holographic sub-frames for each image frame that is supplied to the block. In such an embodiment, preferably one image frame, $I_{xy}$, is supplied one or more times per video frame period as an input to the hardware block. The source of such image frames may be one or more input buffers as shown in the Figure. Each image frame, $I_{xy}$, is then used to produce one or more holographic sub-frames by means of a set of operations comprising one or more of: a phase modulation stage, a space-frequency transformation stage and a quantisation stage. In embodiments, a set of N sub-frames, where N is greater than or equal to one, is generated per frame period by means of using either one sequential set of the aforementioned operations, or a several sets of such operations acting in parallel on different sub-frames, or a mixture of these two approaches.

The purpose of the phase-modulation block shown in FIG. 4 is to redistribute the energy of the input frame in the spatial-frequency domain, such that improvements in final image quality are obtained after performing later operations.

Figure 5:
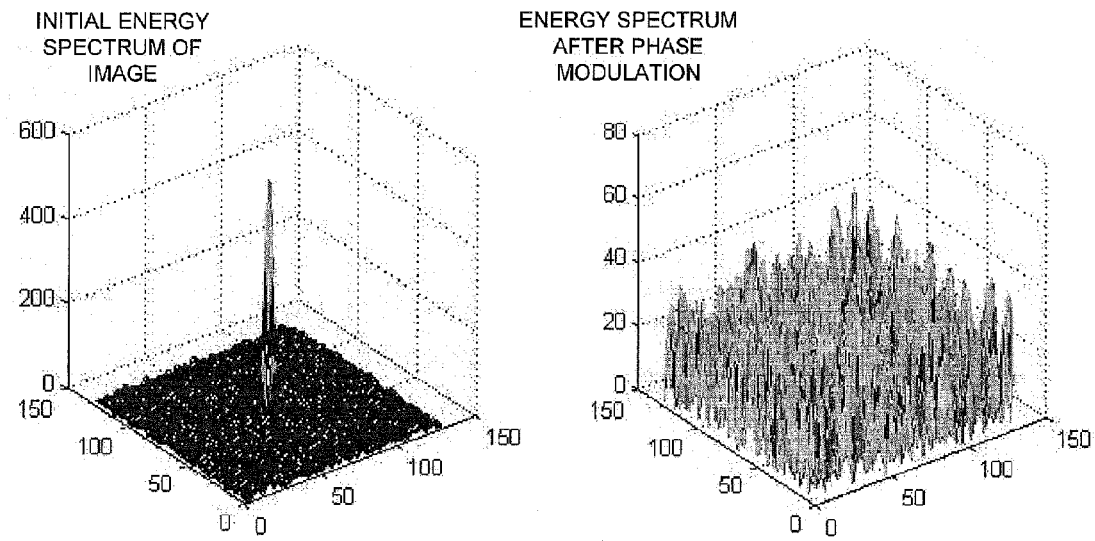
FIG. 5 shows the energy spectra of a sample image before and after multiplication by a random phase matrix.

FIG. 5 shows an example of how the energy of a sample image is distributed before and after a phase-modulation stage (multiplication by a random phase matrix) in which a random phase distribution is used. It can be seen that modulating an image by such a phase distribution has the effect of redistributing the energy more evenly throughout the spatial-frequency domain.

The quantisation hardware shown in FIG. 4 has the purpose of taking complex hologram data, which is produced as the output of the preceding space-frequency transform block, and mapping it to a restricted set of values, which correspond to actual phase modulation levels that can be achieved on a target SLM. In an embodiment, the number of quantisation levels is set at two, with an example of such a scheme being a phase modulator producing phase retardations of 0 or $\pi$ at each pixel. In other embodiments, the number of quantisation levels, corresponding to different phase retardations, may be two or greater. There is no restriction on how the different phase retardations levels are distributed—either a regular distribution, irregular distribution or a mixture of the two may be used. In preferred embodiments the quantiser is configured to quantise real and imaginary components of the holographic sub-frame data to generate a pair of sub-frames for the output buffer, each with two phase-retardation levels. It can be shown that for discretely pixellated fields, the real and imaginary components of the complex holographic sub-frame data are uncorrelated, which is why it is valid to treat the real and imaginary components independently and produce two uncorrelated holographic sub-frames.

Figure 6:
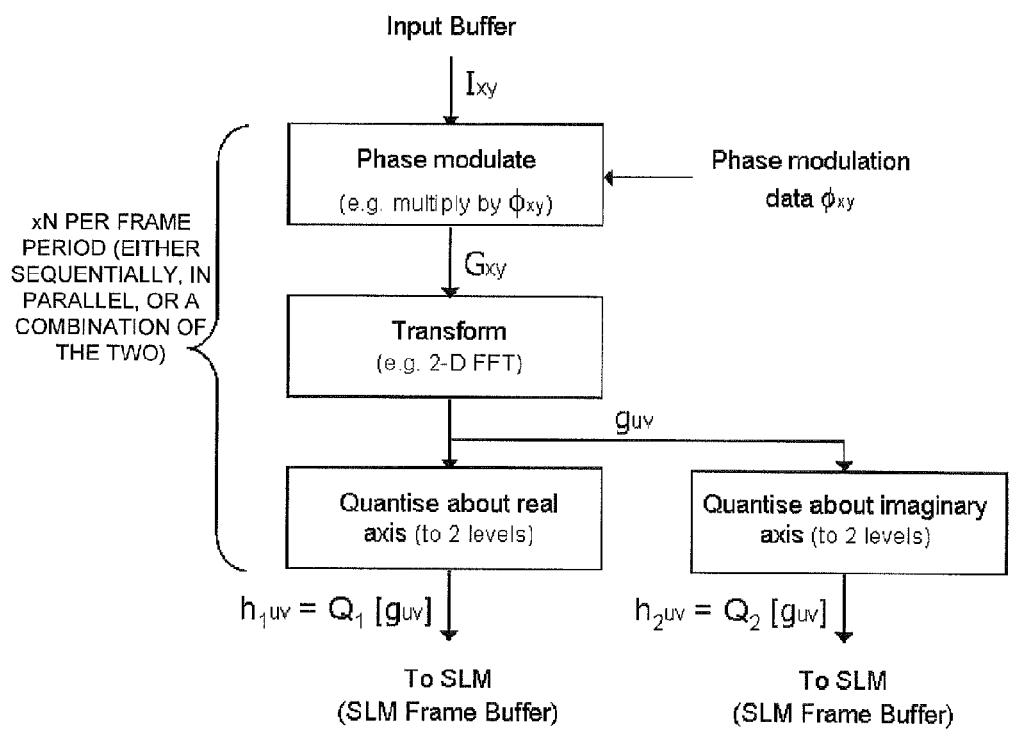
FIG. 6 shows an embodiment of a hardware block with parallel quantisers for the simultaneous generation of two sub-frames from the real and imaginary components of the complex holographic sub-frame data respectively.

FIG. 6 shows a hardware block for FIG. 3 in which a pair of quantisation elements are arranged in parallel in the system so as to generate a pair of holographic sub-frames from the real and imaginary components of the complex holographic sub-frame data respectively.

Figure 7:
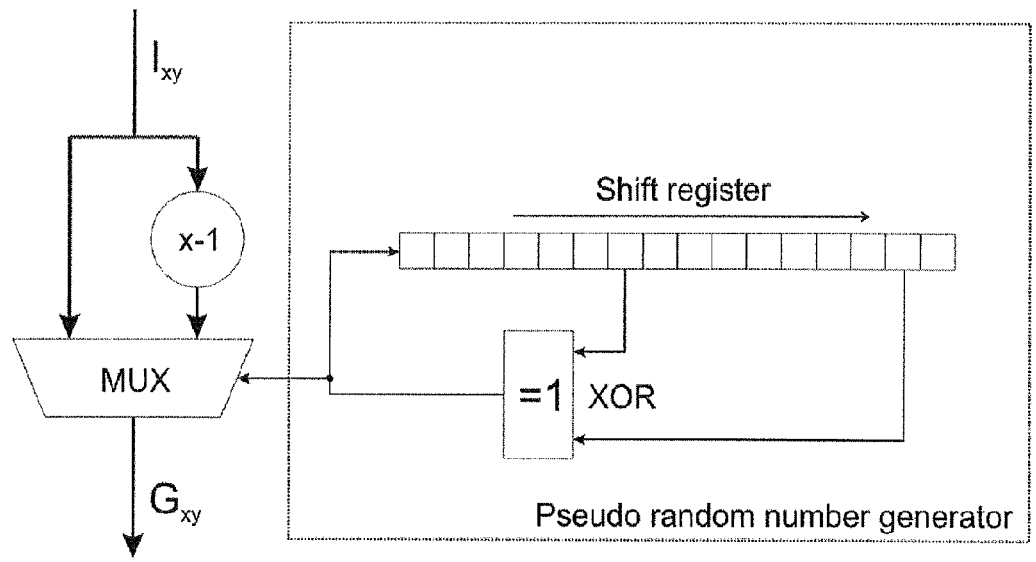
FIG. 7 shows an embodiment of hardware to generate pseudo-random binary phase data and multiply incoming image data, $I_{xy}$, by the phase values to produce $G_{xy}$.

There are many different ways in which phase-modulation data, as shown in FIG. 4, may be produced. In an embodiment, pseudo-random binary-phase modulation data is generated by hardware comprising a shift register with feedback and an XOR logic gate. FIG. 7 shows such an embodiment, which also includes hardware to multiply incoming image data by the binary phase data. This hardware comprises means to produce two copies of the incoming data, one of which is multiplied by −1, followed by a multiplexer to select one of the two data copies. The control signal to the multiplexer in this embodiment is the pseudo-random binary-phase modulation data that is produced by the shift-register and associated circuitry, as described previously.

In another embodiment, pre-calculated phase modulation data is stored in a look-up table and a sequence of address values for the look-up table is produced, such that the phase-data read out from the look-up table is random. In this embodiment, it can be shown that a sufficient condition to ensure randomness is that the number of entries in the look-up table, N, is greater than the value, m, by which the address value increases each time, that m is not an integer factor of N, and that the address values 'wrap around' to the start of their range when N is exceeded. In a preferred embodiment, N is a power of 2, e.g. 256, such that address wrap around is obtained without any additional circuitry, and m is an odd number such that it is not a factor of N.

Figure 8:
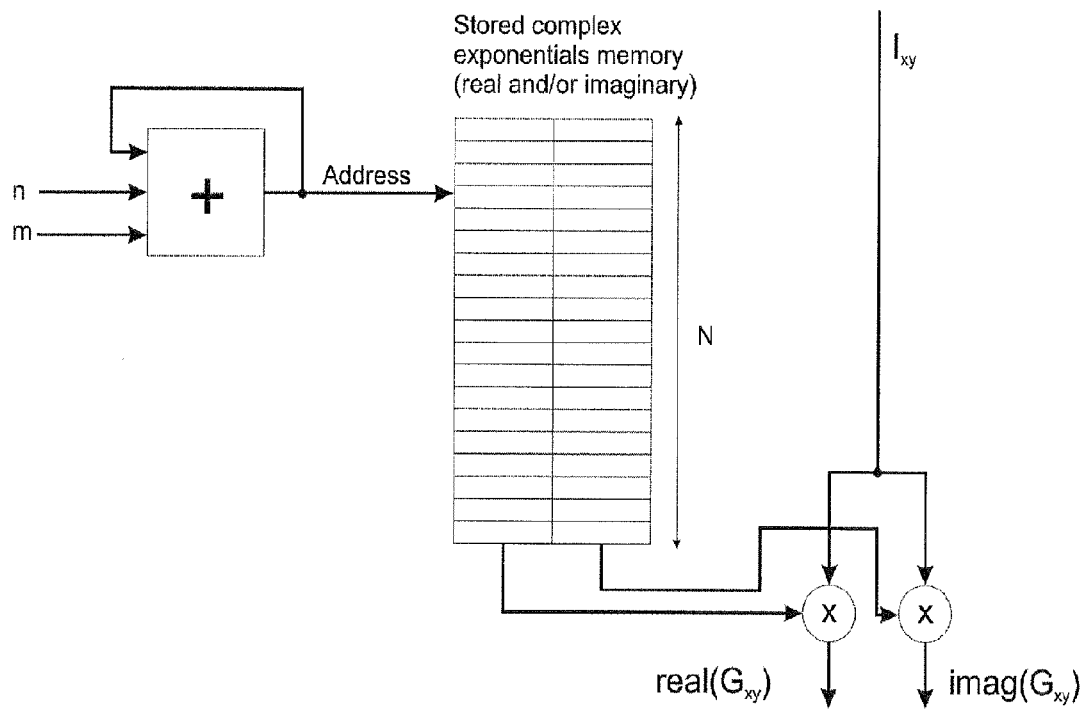
FIG. 8 shows an embodiment of some hardware to multiply incoming image frame data, $I_{xy}$, by complex phase values, which are randomly selected from a look-up table, to produce phase-modulated image data, $G_{xy}$.

FIG. 8 shows hardware to multiply incoming image frame data, $I_{xy}$, by complex phase values, which are randomly selected from a look-up table, to produce phase-modulated image data, $G_{xy}$. The hardware comprises a three-input adder with feedback, which produces a sequence of address values for a look-up table containing a set of N data words, each comprising a real and imaginary component. Input image data, $I_{xy}$, is replicated to form two identical signals, which are multiplied by the real and imaginary components of the selected value from the look-up table. This operation thereby produces the real and imaginary components of the phase-modulated input image data, $G_{xy}$, respectively. In an embodiment, the third input to the adder, denoted n, is a value representing the current holographic sub-frame. In another embodiment, the third input, n, is omitted. In a further embodiment, m and N are both be chosen to be distinct members of the set of prime numbers, which is a strong condition guaranteeing that the sequence of address values is truly random.

Figure 9:
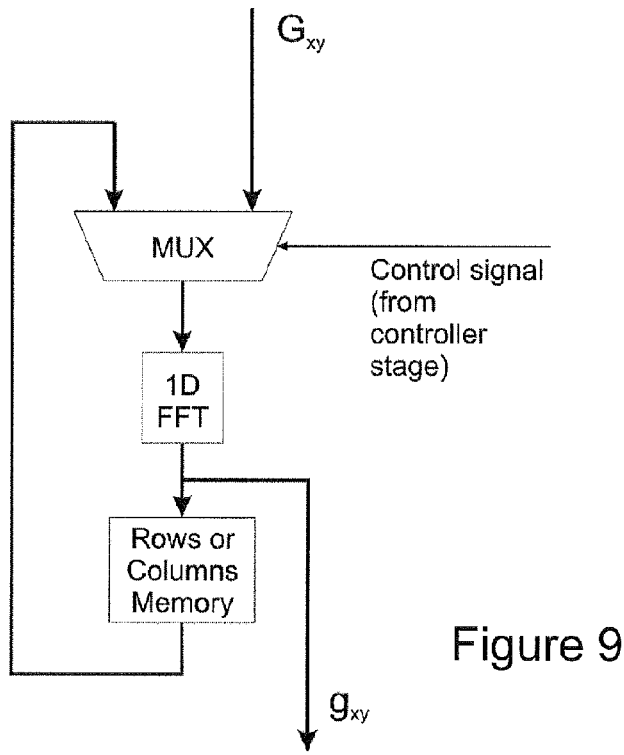
FIG. 9 shows an embodiment of some hardware which performs a 2-D FFT on incoming phase-modulated image data, $G_{xy}$, by means of a 1-D FFT block with feedback, to produce holographic data $g_{uv}$.

FIG. 9 shows hardware which performs a 2-D FFT on incoming phase-modulated image data, $G_{xy}$, as shown in FIG. 4, to produce holographic data, $g_{uv}$. In this example, the hardware to perform the 2-D FET operation comprises a 1-D FET block, a memory element for storing intermediate row or column results, and a feedback path from the output of the memory to one input of a multiplexer. The other input of this multiplexer is the phase-modulated input image data, $G_{xy}$, and the control signal to the multiplexer is supplied from a controller block as shown in FIG. 4. Such an embodiment represents an area-efficient method of performing a 2-D FFT operation.

The operations described above, and in particular those illustrated in FIGS. 4 and 6 may be implemented partially or wholly in software, for example on a general purpose digital signal processor.

Adaptive Noise OSPR

Figure 10:
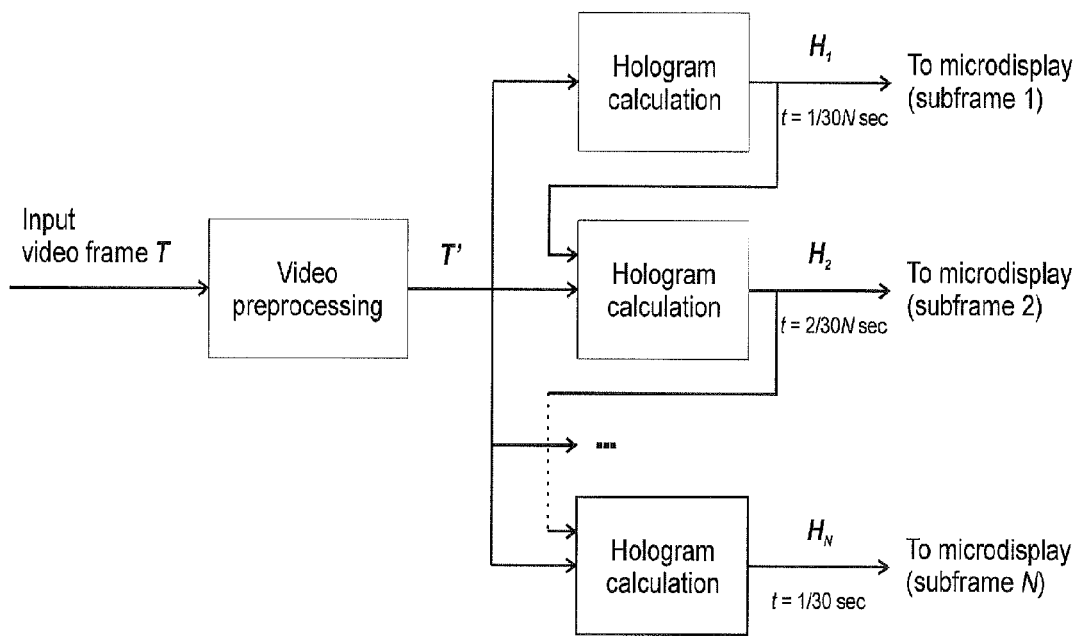
FIG. 10 shows a system according to an embodiment of the invention for generating a plurality (N) of subframe holograms for displaying a single image frame using adaptive (non-independent) noise fields.

Referring now to FIG. 10 this shows an outline block diagram of a system according to an embodiment of the invention for generating a plurality (N) of subframe holograms for displaying a single image frame using adaptive (non-independent) noise fields. Broadly speaking to make high-quality image/video projection using OSPR more practical, a variant of the original approach has been developed, which we term adaptive noise OSPR (OSPR with feedback).

In the "conventional" OSPR approach we have previously described, subframe holograms are generated independently and thus exhibit independent noise. In control terms, this is an open-loop system. However one might expect that better results could be obtained if, instead, the generation process for each subframe took into account the noise generated by the previous subframes in order to cancel it out, effectively "feeding back" the perceived image formed after, say, n OSPR frames to stage n+1 of the algorithm. In control terms, this is a closed-loop system. Such a system is illustrated in outline in FIG. 10. Again, the eye integrates the replay field formed by the N holograms over the 1/30 second time window, resulting in a low noise image.

One embodiment of this approach comprises an adaptive OSPR algorithm which uses feedback as follows: each stage n of the algorithm calculates the noise resulting from the previously-generated holograms $H_1$ to $H_{n-1}$ and factors this noise into the generation of the hologram $H_n$ to cancel it out. As a result, it can be shown that noise variance falls as $1/N^2$. Therefore, conventional OSPR with N=500 is roughly equivalent to adaptive OSPR with N=24, which represents a considerable relaxation in the demands on the display and processing hardware, and is quite feasible to implement with conventional display hardware and silicon.

Figure 11:
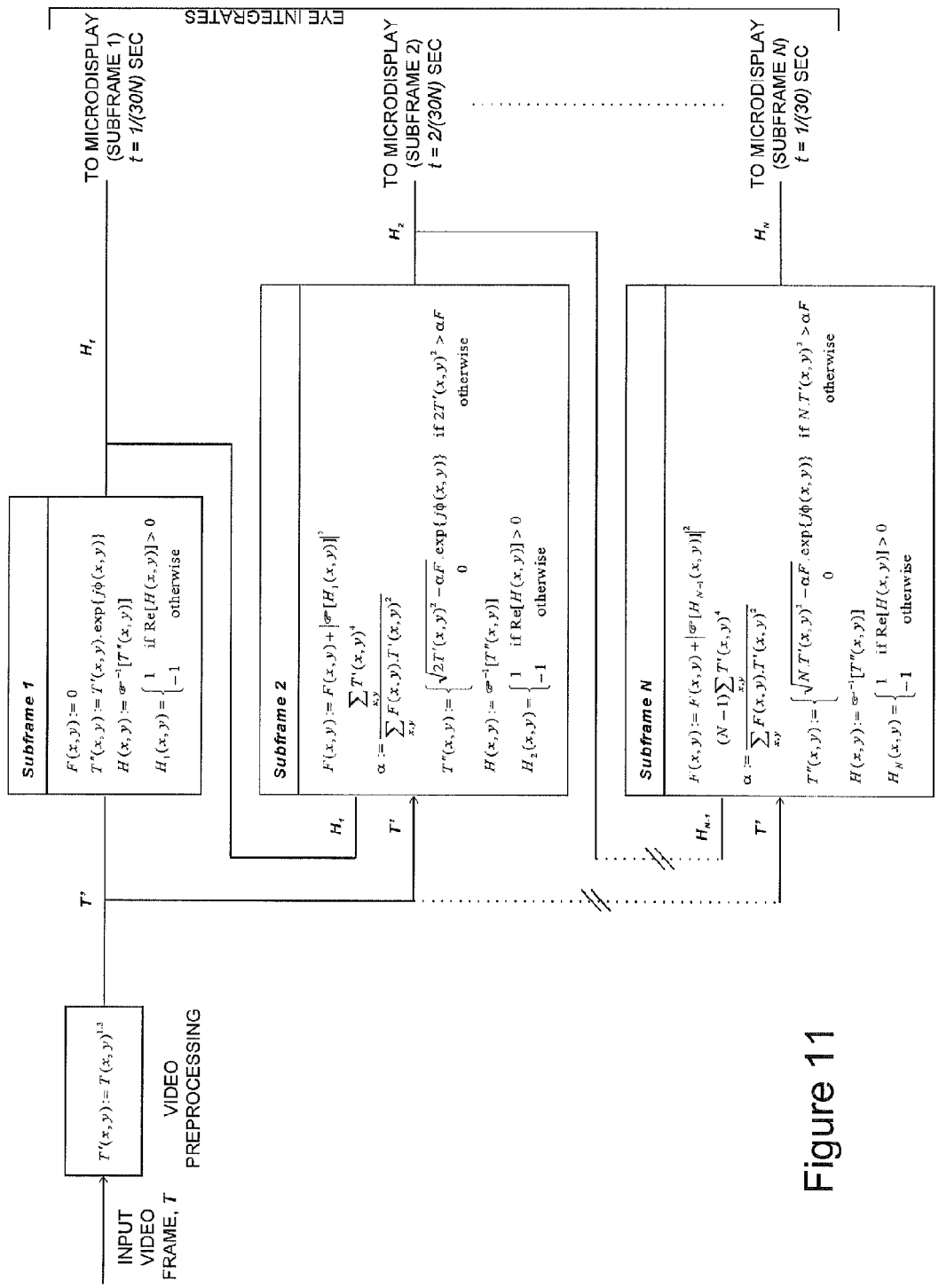
FIG. 11 shows a procedure according to an embodiment of the invention for generating a plurality (N) of adaptive-noise subframe holograms for displaying a single image frame.

This procedure is illustrated in detail in FIG. 11. This procedure takes as input a target image or video frame T, and a parameter N specifying the desired number of hologram subframes to produce, and outputs a set of N holograms $H_1$ to $H_N$ which, when displayed sequentially at an appropriate rate, form as a far-field image a visual representation of T which is perceived as high quality. The process also makes use of a number of intermediate variables. The process operates as follows:

An optional preprocessing step generates a modified target image T' from the supplied target T according to the relation $T'(x, y)=T(x, y)^{1.3}$. This is employed to match the energy properties of a standardized (CRT) display, so that an image projected holographically will appear the same in terms of gamma as if the image were shown on a conventional display. More generally the process may employ $T'(x, y):=T(x, y)^{\gamma/2}$ where $\gamma$ is the desired display output gamma (a range of from about 2.1 to 2.6 corresponds roughly to a standard CRT).

At each stage n of the algorithm (out of a total of N stages), the array F keeps track of the "running total" (consisting of the desired image, plus noise) of the image energy formed by the previous holograms $H_1$ to $H_{n-1}$ so that the noise may be evaluated and taken into account in the subsequent stage. F is initialized to zeroes at the start of the procedure, and at each stage n the image energy from the hologram $H_{n-1}$ formed in the previous stage is calculated using a Fourier transform and added, i.e.

$$F(x,y) := F(x,y) + |\mathcal{F}[H_{n-1}(x,y)]|^2$$

A random phase factor $\phi$ is added at each stage to each pixel of the target image. The addition of this randomized phase component results in even distribution of the energy in the frequency domain, which is used to avoid excessive quality degradation in the subsequent quantization step.

At each stage, the target image is adjusted to take the noise from the previous stages into account. The adjustment is carried out by calculating a scaling factor $\alpha$ to match the intensity of the noisy "running total" energy F with the target image energy $(T')^2$, such that the total noise energy from the previous n−1 stages is given by $\alpha F - (n-1)(T')^2$, according to the relation $$\alpha := \frac{\sum_{x,y} T'(x, y)^4}{\sum_{x,y} F(x, y) \cdot T'(x, y)^2}$$

Therefore, the target energy at this stage is given by the difference between the desired target energy at this iteration and the previous noise present in order to cancel that noise out, i.e. $(T')^2 - [\alpha F - (n-1)(T')^2] = n(T')^2 + \alpha F$, giving a target amplitude $|T''|$ equal to the square root of this energy value, i.e.

$$T''(x, y) := \begin{cases} \sqrt{2T'(x, y)^2 - \alpha F} \cdot \exp\{j\phi(x, y)\} & \text{if } 2T'(x, y)^2 > \alpha F \\ 0 & \text{otherwise} \end{cases}$$

At each stage n, H represents an intermediate fully-complex hologram formed from the target T'' and is calculated using an inverse Fourier transform operation, $\mathcal{F}^{-1}$. It is quantized to binary phase to form the output hologram $H_n$, i.e.

$$H(x, y) := \mathcal{F}^{-1}[T''(x, y)]$$

$$H_n(x, y) = \begin{cases} 1 & \text{if } \text{Re}[H(x, y)] > 0 \\ -1 & \text{otherwise} \end{cases}$$

In more detail, the calculations preformed in the respective subframes, in the blocks shown in FIG. 11, are as follows:

$$F(x, y) := 0 \quad\quad \text{Subframe 1}$$

$$T''(x, y) := T'(x, y) \cdot \exp\{j\phi(x, y)\}$$

$$H(x, y) := \mathcal{F}^{-1}[T''(x, y)]$$

$$H_1(x, y) := \begin{cases} 1 & \text{if } \text{Re}[H(x, y)] > 0 \\ -1 & \text{otherwise} \end{cases}$$

Output $H_1$ to the microdisplay (as subframe 1), for example at t=1/(30N) seconds. (Note that in the above the array F(x,y) is different to the inverse transform operator $\mathcal{F}^{-1}$, or transform operator $\mathcal{F}$).

$$F(x, y) := F(x, y) + |\mathcal{F}[H_1(x, y)]|^2 \quad\quad \text{Subframe 2}$$

$$\alpha := \frac{\sum_{x,y} T'(x, y)^4}{\sum_{x,y} F(x, y) \cdot T'(x, y)^2}$$

$$T''(x, y) :=$$

$$\begin{cases} \sqrt{2T'(x, y)^2 - \alpha F} \cdot \exp\{j\phi(x, y)\} & \text{if } 2T'(x, y)^2 > \alpha F \\ 0 & \text{otherwise} \end{cases}$$

$$H(x, y) := \mathcal{F}^{-1}[T''(x, y)]$$

$$H_2(x, y) := \begin{cases} 1 & \text{if } \text{Re}[H(x, y)] > 0 \\ -1 & \text{otherwise} \end{cases}$$

Output $H_2$ to the microdisplay (as subframe 2), for example at t=2/(30N) seconds.

$$F(x, y) := F(x, y) + |\mathcal{F}[H_{N-1}(x, y)]|^2 \quad \text{update dynamic output estimate}$$

$$\alpha := \frac{(N-1)\sum_{x,y} T'(x, y)^4}{\sum_{x,y} F(x, y) \cdot T'(x, y)^2}$$

$$T''(x, y) := \begin{cases} \sqrt{N \cdot T'(x, y)^2 - \alpha F} \cdot \exp\{j\phi(x, y)\} & \text{if } N \cdot T'(x, y)^2 > \alpha F \\ 0 & \text{otherwise} \end{cases}$$

calculate noise compensation target $$H(x, y) := \mathcal{F}^{-1}[T''(x, y)]$$

$$H_N(x, y) := \begin{cases} 1 & \text{if } \text{Re}[H(x, y)] > 0 \\ -1 & \text{otherwise} \end{cases}$$

Subframe N calculate binary hologram $H_N$ (other approaches may be use

Output $H_N$ to the microdisplay (as subframe N), for example at t=1/30 seconds.

Referring to subframes 1, 2, ... N, output to the microdisplay as described above, the sys integrates the replay field formed by these N holograms over the, in this example 1/30 second, time window, resulting in a low noise image.

Figure 12:
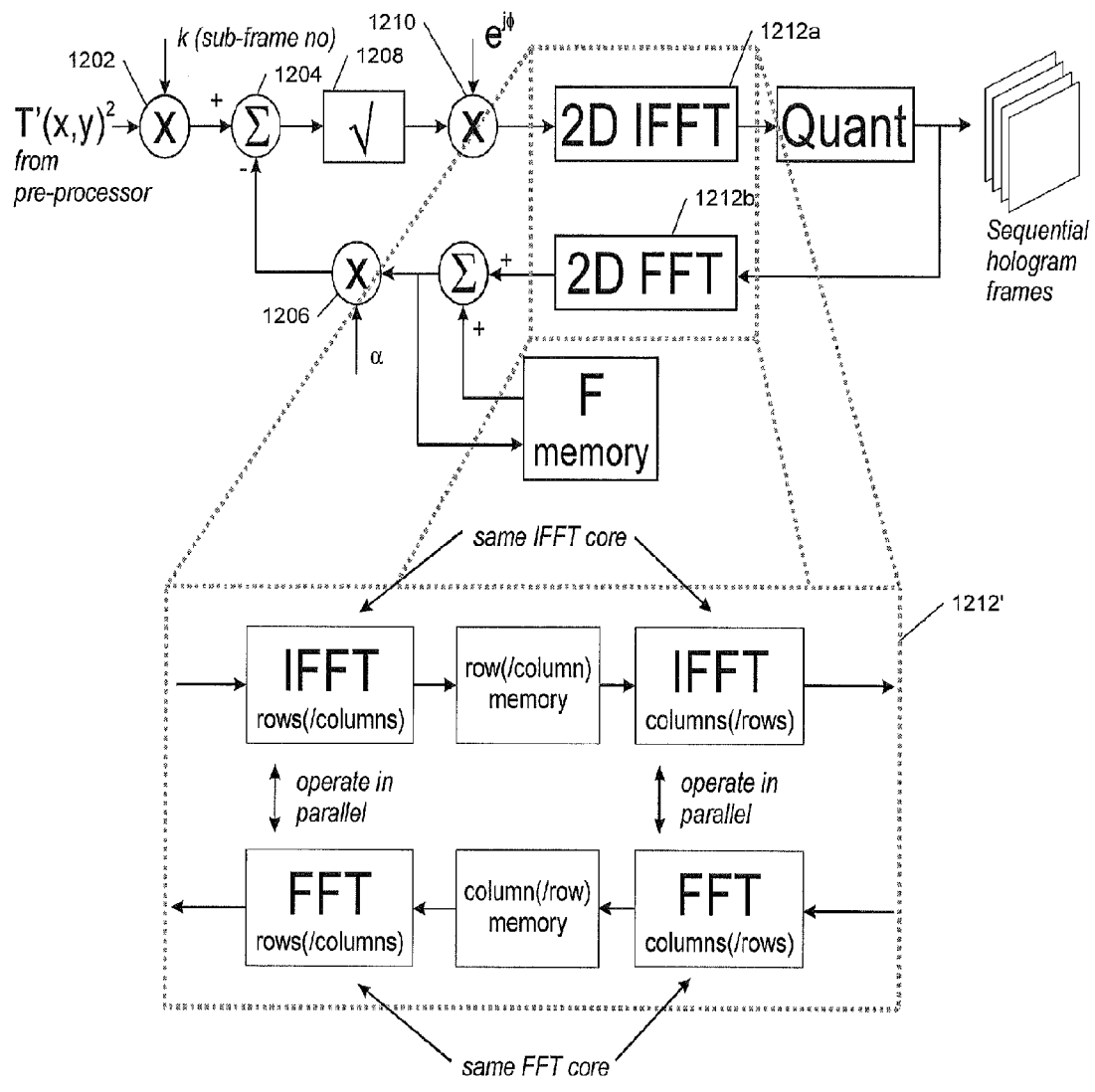
FIG. 12 shows a system according to an embodiment of the invention for generating a plurality (N) of adaptive-noise subframe holograms for displaying a single image frame.

FIG. 12 illustrates an embodiment of a system 1200 to implement the above-described method. In FIG. 12, the pre-processed input image data T'(x,y)² is scaled by the iteration (sub-frame) number N=n-1 by multiplier 1202, and the subtraction of array F is performed by summer 1204, the scaling factor α having been applied by multiplier 1206. A square root operation is performed by module 1208 and multiplier 1210 adds the random phase factor φ. The IFFT and FFT operations 1212a,b used to determine H and F respectively are preferably implemented by a common core 1212', since the forward and inverse transforms employ similar calculations. The IFFT and FFT operations 1212a,b are 2D operations but they may conveniently be implemented by two sets of 1D operations, as shown. Preferably substantially all the modules in the system are pipelined, to facilitate substantially continuous-throughput operation. Applications for the above described methods and systems include, but are not limited to the following: Mobile phone; PDA; Laptop; Digital camera; Digital video camera; Games console; In-car cinema; Personal navigation systems (in-car or wristwatch GPS); Watch; Personal media player (e.g. MP3 player, personal video player); Dashboard mounted display; Laser light show box; Personal video projector (the "video iPod" idea); Advertising and signage systems; Computer (including desktop); Remote control units; desktop computers, televisions, home multimedia entertainment devices and so forth.

No doubt many other effective alternatives will occur to the skilled person. It will be understood that the invention is not limited to the described embodiments and encompasses modifications apparent to those skilled in the art lying within the spirit and scope of the claims appended hereto.

What is claimed is:

1. A method of generating data for displaying an image defined by displayed image data using a plurality of holographically generated temporal subframes, said temporal subframes being displayed sequentially in time such that they are perceived as a single noise-reduced image, the method comprising generating from said displayed image data holographic data for each subframe of said set of subframes such that successive replay of holograms defined by said holographic data for said subframes gives the appearance of said image, and wherein the method further comprises, when generating said holographic data for a subframe, compensating for noise in said displayed image arising from one or more previous subframes of said sequence of holographically generated subframes;
wherein said compensating comprises:
determining a noise compensation frame for a subframe; and
determining an adjusted version of said displayed image data using said noise compensation frame prior to said generation of holographic data for a subframe; and
wherein said adjusting comprises transforming said previous subframe data from a frequency domain to a spatial domain, and subtracting said transformed data from data derived from said displayed image data.

2. A method as claimed in claim 1 wherein said compensating for noise arising from one or more of said previous subframes comprises, for each said successive subframe after the first, compensating for noise in the previous subframe, whereby each additional subframe substantially completely compensates for noise introduced by all previous subframes.

3. A method as claimed in claim 1 wherein said determining of a noise compensation frame for said subframe comprises accumulating noise compensation frames from one or more previous said subframes.

4. A method as claimed in claim 3 wherein said accumulating of noise compensation frames comprises, for each successive subframe, accumulating displayed subframe data for a previously displayed subframe, said displayed subframe data comprising spatial image data for the subframe derived from said holographic subframe data.

5. A method as claimed in claim 1 further comprising, when generating said holographic data for said subframe, determining displayed image subframe data for a previous said subframe, and determining target displayed image data for generating said holographic data for said current subframe by adjusting said displayed image data using said displayed subframe data for said previous subframe.

6. A method as claimed in claim 1 wherein said data derived from said displayed image data comprises a scaled version of said displayed image data.

7. A method as claimed in claim 1 further comprising pre-processing said displayed image data prior to generating said holographic data to adjust a response of said displayed image to said displayed image data.

8. A non-transitory data carrier carrying processor control code to, when running, implement the method of claim 1.

9. A method of generating data for displaying an image defined by displayed image data using a plurality of holographically generated temporal subframes, said temporal subframes being displayed sequentially in time such that they are perceived as a single noise-reduced image, the method comprising generating from said displayed image data holographic data for each subframe of said set of subframes such that successive replay of holograms defined by said holographic data for said subframes gives the appearance of said image, and wherein the method further comprises, when generating said holographic data for a subframe, compensating for noise in said displayed image arising from one or more previous subframes of said sequence of holographically generated subframes;

wherein generating of said holographic data from said displayed image data for each subframe of said set of subframes comprises:

substantially randomising a phase component of data derived from said displayed image data from which said holographic subframe data is to be generated;

transforming said randomised data from a spatial domain into a frequency domain; and quantising said transformed data.

10. A non-transitory data carrier carrying processor control code to, when running, implement the method of claim 9.

11. A hardware image display system for displaying an image defined by displayed image data using a plurality of holographically generated temporal subframes, said temporal subframes being displayed sequentially in time such that they are perceived as a single noise-reduced image, by generating from said displayed image data holographic data for each subframe of said set of subframes such that successive replay of holograms defined by said holographic data for said subframes gives the appearance of said image, the system comprising:

an input for said displayed image data;

a space-frequency transform system having an input coupled to said displayed image data input and having an output, for performing a 2D space-frequency transform of data derived from said displayed image data;

a holographic image data output coupled to said space-frequency transform system output; and a frequency-space transform system having an input coupled to said holographic image data output, and having an output, for performing a 2D frequency-space transform of data derived from said holographic subframe data; and a noise reduction system coupled between said displayed image data input and said space-frequency transform system input and to said frequency-space transform system output for adjusting said displayed image data using holographic subframe data for a subframe prior to generation of subframe data for a subsequent subframe.

12. A hardware image display system for displaying an image defined by displayed image data using a plurality of holographically generated temporal subframes, said temporal subframes being displayed sequentially in time such that they are perceived as a single noise-reduced image, by generating from said displayed image data holographic data for each subframe of said set of subframes such that successive replay of holograms defined by said holographic data for said subframes gives the appearance of said image, the system comprising:

an input for said displayed image data;

space-frequency transform circuitry having an input coupled to said displayed image data input and having an output, for performing a 2D space-frequency transform of data derived from said displayed image data;

a holographic image data output coupled to said space-frequency transform circuitry output; and frequency-space transform circuitry having an input coupled to said holographic image data output, and having an output, for performing a 2D frequency-space transform of data derived from said holographic subframe data; and noise reduction circuitry coupled between said displayed image data input and said space-frequency transform circuitry input and to said frequency-space transform circuitry output for adjusting said displayed image data using holographic subframe data for a subframe prior to generation of subframe data for a subsequent subframe.

13. A hardware image display system for displaying an image defined by displayed image data using a plurality of holographically generated temporal subframes, said temporal subframes being displayed sequentially in time such that they are perceived as a single noise-reduced image, by generating from said displayed image data holographic data for each subframe of said set of subframes such that successive replay of holograms defined by said holographic data for said subframes gives the appearance of said image, the system comprising:

an input for said displayed image data;

space-frequency transform code having an input coupled to said displayed image data input and having an output, for performing a 2D space-frequency transform of data derived from said displayed image data;

a holographic image data output coupled to said space-frequency transform code output; and frequency-space transform code having an input coupled to said holographic image data output, and having an output, for performing a 2D frequency-space transform of data derived from said holographic subframe data;

noise reduction code coupled between said displayed image data input and said space-frequency transform code input and to said frequency-space transform code output for adjusting said displayed image data using holographic subframe data for a subframe prior to generation of subframe data for a subsequent subframe;

a program memory storing the space-frequency transform code, the frequency-space transform code, and the noise reduction code; and a processor coupled to the program memory and configured to execute the space-frequency transform code, the frequency-space transform code, and the noise reduction code.

\* \* \* \* \*